(12) United States Patent
Patel

(10) Patent No.: US 11,424,926 B2
(45) Date of Patent: Aug. 23, 2022

(54) TOKENIZED ENCRYPTION SYSTEM FOR PRESERVING ANONYMITY WHILE COLLECTING BEHAVIORAL DATA IN NETWORKED SYSTEMS

(71) Applicant: Yo Corporation, Houston, TX (US)

(72) Inventor: Devang Jitendra Patel, Austin, TX (US)

(73) Assignee: Yo Corporation, Houston, TX (US)

( * ) Notice: Subject to any disclaimer, the term of this patent is extended or adjusted under 35 U.S.C. 154(b) by 142 days.

(21) Appl. No.: 16/857,125

(22) Filed: Apr. 23, 2020

(65) Prior Publication Data

US 2021/0336787 A1 Oct. 28, 2021

(51) Int. Cl.
| | | |
|---|---|---|
| *H04L 29/06* | (2006.01) | |
| *H04L 9/32* | (2006.01) | |
| *H04L 9/06* | (2006.01) | |
| *H04L 9/08* | (2006.01) | |
| *H04L 9/40* | (2022.01) | |

(52) U.S. Cl.
CPC .......... *H04L 9/3213* (2013.01); *H04L 9/0643* (2013.01); *H04L 9/0863* (2013.01); *H04L 63/0421* (2013.01)

(58) Field of Classification Search
None
See application file for complete search history.

(56) References Cited

U.S. PATENT DOCUMENTS

| | | | | |
|---|---|---|---|---|
| 9,262,623 | B2 * | 2/2016 | Stecher | ................... H04L 63/00 |
| 9,514,446 | B1 * | 12/2016 | Rajkumar | ............. H04L 9/0861 |
| 11,042,719 | B2 * | 6/2021 | Rodriguez | ............ H04L 9/3213 |
| 2018/0060989 | A1 * | 3/2018 | Hietanen | ............ G06K 7/10722 |
| 2018/0247079 | A1 * | 8/2018 | Ollikainen | .......... G06F 21/6263 |
| 2020/0050795 | A1 * | 2/2020 | Solomon | ............. G06F 16/2255 |
| 2020/0211080 | A1 * | 7/2020 | Frederick | ........... G06Q 30/0251 |
| 2021/0090109 | A1 * | 3/2021 | Vlahovic | ........... G06Q 30/0255 |
| 2021/0336787 | A1 * | 10/2021 | Patel | ..................... H04L 9/0643 |
| 2021/0406400 | A1 * | 12/2021 | Tawakol | ............ G06Q 30/0251 |

* cited by examiner

*Primary Examiner* — Jeffery L Williams
(74) *Attorney, Agent, or Firm* — Shah IP Law, PLLC

(57) ABSTRACT

The present disclosure is generally directed to systems and methods for providing privacy to a user of a user device that is used for interacting with a networked software platform. A server computer coupled to the user device receives a hashed device ID of the device and generates a unique user ID in the form of a unique number. The user ID can be used by the server and other entities to gather information related to the activities of the user with respect to the networked software platform, which can be, for example, a video game platform, a social media platform, or a health-related diagnostic tool. The identity of the user remains anonymous during the information gathering procedures because neither the device ID nor the identity of the user is transmitted over the network when the user is participating in activities of the networked software platform.

8 Claims, 6 Drawing Sheets

TOKENIZED ENCRYPTION SYSTEM FOR PRESERVING ANONYMITY WHILE COLLECTING BEHAVIORAL DATA IN NETWORKED SYSTEMS

CROSS-REFERENCE TO RELATED APPLICATIONS

None

BACKGROUND

Field of the Art

The present invention generally relates to providing privacy to a user of a user device, and more particularly relates to providing privacy to a user of a user device that is used to interact with a networked software platform accessed by multiple user devices.

Discussion of the State of the Art

Users of networked software platforms such as a social media platform (Facebook®, WhatsApp®, Twitter®, etc.) or a video game platform (Microsoft Xbox®, Sony Playstation®, etc.) prefer to connect with each other by revealing some aspect of their identity to other users, but prefer to remain anonymous in certain other aspects. For example, participants of a social media platform may prefer to conceal private information such as legal name, home address, and financial information when interacting with others on the social media platform. In some cases, this may be achieved by the use of aliases and fictitious information. However, a hosting service of the social media platform, such as Facebook®, for example, may gather some type of information such as, for example, usage statistics and/or behavioral data for serving targeted advertisements, offers, etc. It is desirable that every individual be allowed to retain his/her privacy when such information is being collected and/or analyzed by the hosting service, but every such attempt to preserve anonymity is often thwarted by networked software platforms because, ultimately, software platforms are able track user actions on their respective platforms against various identifiers, such as user identifier (user ID), device identifier (device ID), IP address, etc. As such, protecting user anonymity—while enabling users to connect with other users on a platform—has become an intractable problem.

As another example, a first gamer playing against other gamers on a video game platform may prefer to conceal private information such as his/her legal name, home address, and identification of a hardware platform being used for playing the video game. On the other hand, the first gamer may like to know gaming credentials of one or more of the other gamers who are participating in a video game. The gaming credentials may provide an indication of a skill level and experience of a gamer. Conversely, the other gamers may like to know the gaming credentials of the first gamer. Consequently, a hosting service is typically provided the ability to collect information about all gamers for this purpose. However, it is desirable for each gamer to retain privacy when such credentials are being collected and/or analyzed by the hosting service.

Irrespective of the level of privacy desired and/or offered to an individual, operating a networked software platform necessitates the use of certain types of identifiers in order to route signals through a network and provide interconnectivity between the various user devices. For example, each user device coupled to the Internet is designated an Internet Protocol (IP) address. The IP address is used as an identification label for routing data packets through the Internet. The IP address of a device can be changed without adversely affecting its effectiveness as a communication identifier of a device. However, the IP address of a device typically does not provide information about the device to which the IP address has been assigned (computer, data router, data switcher, smartphone, smart appliance etc.) nor does it provide information about an individual operating the device.

Specific details about a device may be obtained by the use of device identifiers. Some examples of device identifiers include an Object Identifier (Object ID), a Universally Unique Identifier (UUID), and an International Mobile Equipment Identity (IMEI). These device identifiers are not typically used for communication purposes but may be used in some applications, such as, for example, some video game applications or some social media applications. When used, the device identifiers can not only provide information about a user device but may also provide details of a user of the user device (for example, the name of a person registered to use a smartphone having a specific UUID). For at least this reason, it is desirable that the user of the user device be provided privacy when information is obtained by use of a device identifier or any other such items that uniquely identify a device.

SUMMARY

The present invention overcomes the limitations outlined above by creating systems and methods for providing privacy to a user of a user device. The user device is used by the user to interact with a networked software platform. The phrase "networked software platform" as used herein is not directed exclusively at software per se, but is intended to encompass a combination of hardware and software configured to run a software application such as, for example, a social media application (Facebook®, WhatsApp®, Twitter®, etc.), a video game played on a computer and/or on a dedicated gaming machine such as Microsoft Xbox® and Sony Playstation®, or a health-related application such as, for example, a diagnostic tool used to monitor blood sugar level, blood pressure, heart condition, etc. As such, the words "platform" and "application" may be used interchangeably in this disclosure and must be understood as referring to software, hardware, and/or a combination of hardware and software.

The present invention generally involves generating of a unique user identifier (user ID) from a device identifier (device ID) of a user device and using the user ID for various purposes. In one exemplary implementation, a server computer coupled to the user device receives the device ID of the device and generates a unique user ID in the form of a unique number having "n" digits (n=16, for example). The user ID can be used by the server, for example, to gather information related to the activities and/or behaviors of a user of the user device with respect to a networked software platform such as, for example, a video game platform, a social media platform, or a health-related diagnostic tool. The identity of the user of the user device remains anonymous during the information gathering procedures because neither the device ID nor the identity of the user is transmitted over the network when the user is participating in activities of the networked software platform. Furthermore, information pertaining to the health of a user who is using a health-related diagnostic tool on the user device may be transmitted with a guaranteed level of privacy from the user device to a medical professional and/or a medical professional. Such privacy can be configured to conform to Health Insurance Portability and Accountability Act (HIPPA) rules and regulations.

BRIEF DESCRIPTION OF THE FIGURES

The accompanying drawings illustrate several embodiments and, together with the description, serve to explain the principles of the invention according to the embodiments. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably. It will be appreciated by one skilled in the art that the particular arrangements illustrated in the drawings are merely exemplary and are not to be considered as limiting of the scope of the invention or the claims herein in any way.

DETAILED DESCRIPTION

Figure 1:
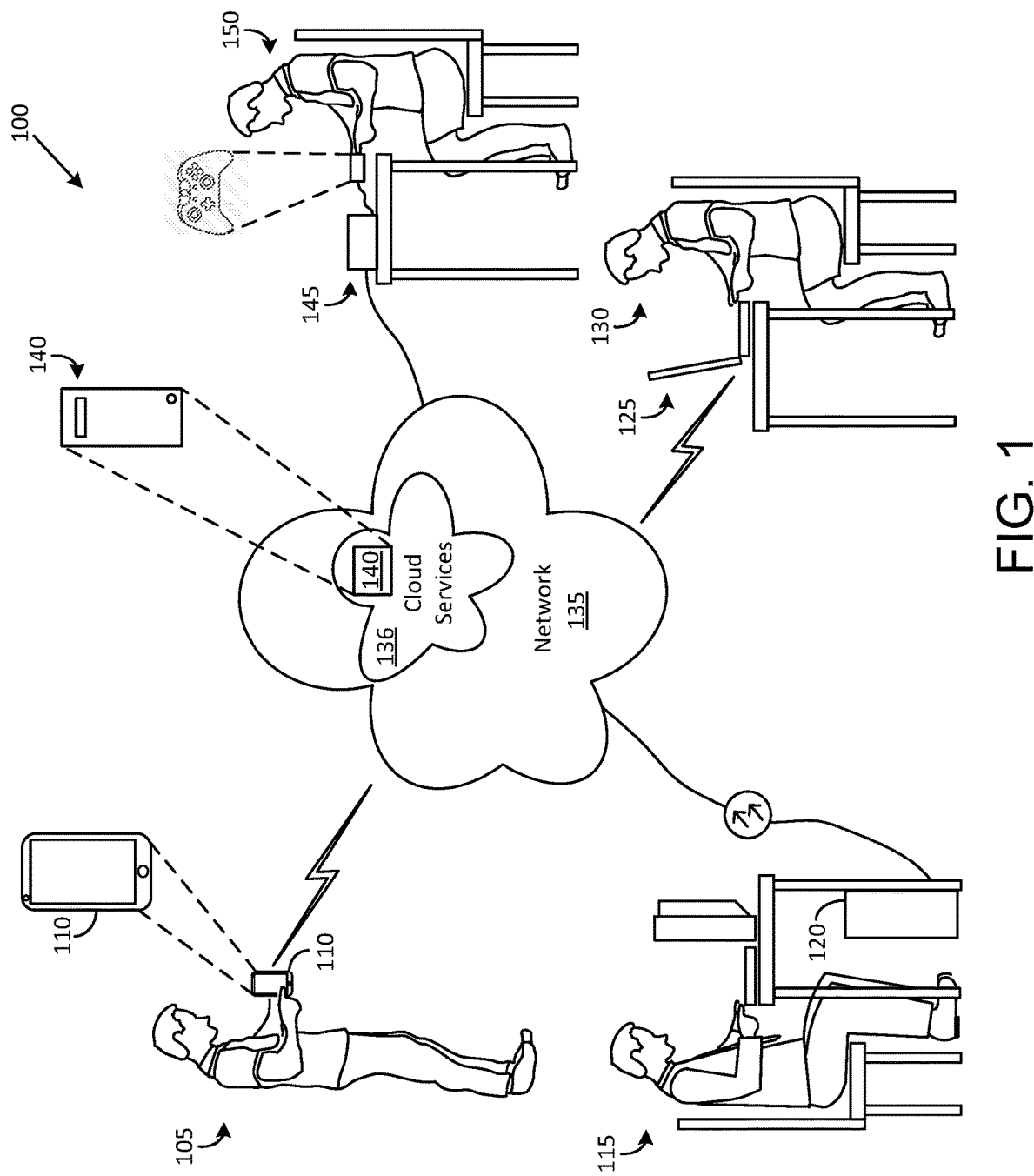
FIG. 1 illustrates an exemplary system for providing privacy to a user of a user device that supports a networked software platform in accordance with the disclosure.

The inventor has conceived, and reduced to practice, a system and method for providing privacy to a user of a user device that is used by the user to interact with a networked software platform. One or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural, logical, software, electrical and other changes may be made without departing from the scope of the embodiments. Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible embodiments and in order to more fully illustrate one or more embodiments. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, method, or algorithm is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various embodiments in which, for example, functions may be executed out of order from that shown or discussed, including substantially concurrently or in reverse order, depending on the functionality involved, as would be understood by those having ordinary skill in the art.

Conceptual Architecture

FIG. 1 illustrates an exemplary system 100 for providing privacy to a first user 105 of a networked user device 110 in accordance with the disclosure. It must be understood that the description provided herein with respect to the user device 110 and the first user 105 is equally applicable to various other user devices and users. Accordingly, a description of the components of the user device 110 and/or functions executed on the user device 110 is equally applicable to other user devices such as a user device 125 and a user device 145 that are two other examples of user devices.

In the exemplary system 100, the user device 110 is communicatively coupled to the user device 125 and the user device 145 via a network 135. Various other components such as, for example, a server computer 140 and a computer 120, are also communicatively coupled via the network 135 to the user device 110, the user device 125, and the user device 145.

The network 135 may include any one, or a combination of networks, such as, for example, the Internet, an intranet, an extranet, a virtual private network (VPN), a local area network (LAN), a wireless LAN (WLAN), a wide area network (WAN), or a metropolitan area network (MAN). The present disclosure contemplates any suitable network 135.

The user device 110, the user device 125, the user device 145, the server computer 140, and the computer 120 are coupled to the network 135 via communication links. The various communication links illustrated in FIG. 1 are shown in a particular form (wired, wireless, optical, etc.) solely for purposes of illustration and it must be understood, for example, that a wireless communication link in one implementation can be replaced and/or complemented with a wired communication link in another implementation; a wired communication link in one implementation can be replaced and/or complemented with an optical communication link in another implementation; and so on.

The exemplary system 100 illustrates the first user 105 who is operating the user device 110 interacting with a second user 130 who is operating the user device 125 and/or a third user 150 who is operating the user device 145. The interaction may take place on a networked software platform such as, for example, a social media platform (Facebook®, Twitter®, etc.), an online video game platform, or a health-related application. Additional users (not shown) may also be participating along with the first user 105, the second user 130, and the third user 150 in activities carried out on the networked software platform.

An administrator 115 operates the computer 120 in order to carry out various actions associated with the operations of the networked software platform. For example, the administrator 115 may obtain information about the behaviors and activities of one or more of the users upon the networked software platform, in order to monitor for malignant behavior (hacking, phishing, spreading disinformation, etc.). In one example, the administrator 115 may be a medical professional in one of various places such as a test lab, a hospital, or a clinic. The medical professional may obtain health-related information of one or more users, from the server computer 140 and/or from one or more user devices.

As another example, the administrator 115 may interact with one or more server computers such as the server computer 140 to obtain information about one or more of the users upon the networked software platform such as, for example, credit history, health-related information, and/or background verification. The server computer 140 may be a standalone computer in some implementations and in some other implementations, may be one computer of a system of computers that provides cloud services 136 via the network 135. One example of cloud services 136 is Amazon Web Services (AWS®).

The server computer 140 may be used to host the networked software platform on various client devices such as, for example, the user device 110, the user device 125, and the user device 145.

In the example embodiment illustrated in FIG. 1, the user device 110 is a smartphone, the user device 125 is a laptop computer, and the user device 145 is a dedicated video game system, which are merely three examples of user devices (client devices). In various other embodiments, each of the user devices can be any electronic device that includes hardware, software, or a combination thereof, that can perform various operations in accordance with the disclosure such as, for example, to execute a networked software platform that operates in the manner described herein. For example, the user device 110 may be a tablet computer, a phablet (phone plus tablet), a desktop computer, a notebook computer, a netbook computer, or a dedicated gaming platform (Microsoft Xbox®, Sony Playstation®, etc.).

The user device 110 may include a web browser, such as Microsoft Internet Explorer® or Google Chrome®, on which the networked software platform described herein can be displayed and operated. In some embodiments, the networked software platform may be operable without the use of a web browser. In such cases, the user device 110 can include software and hardware to support the networked software platform independently. The networked software platform may be provided in the user device 110 in various ways such as, for example, in the form of a software application that is preloaded by a manufacturer of the user device 110, or in the form of a software application that is downloaded from an online source such as, for example, the Google Playstore®.

Detailed Description of Exemplary Embodiments

Figure 2:
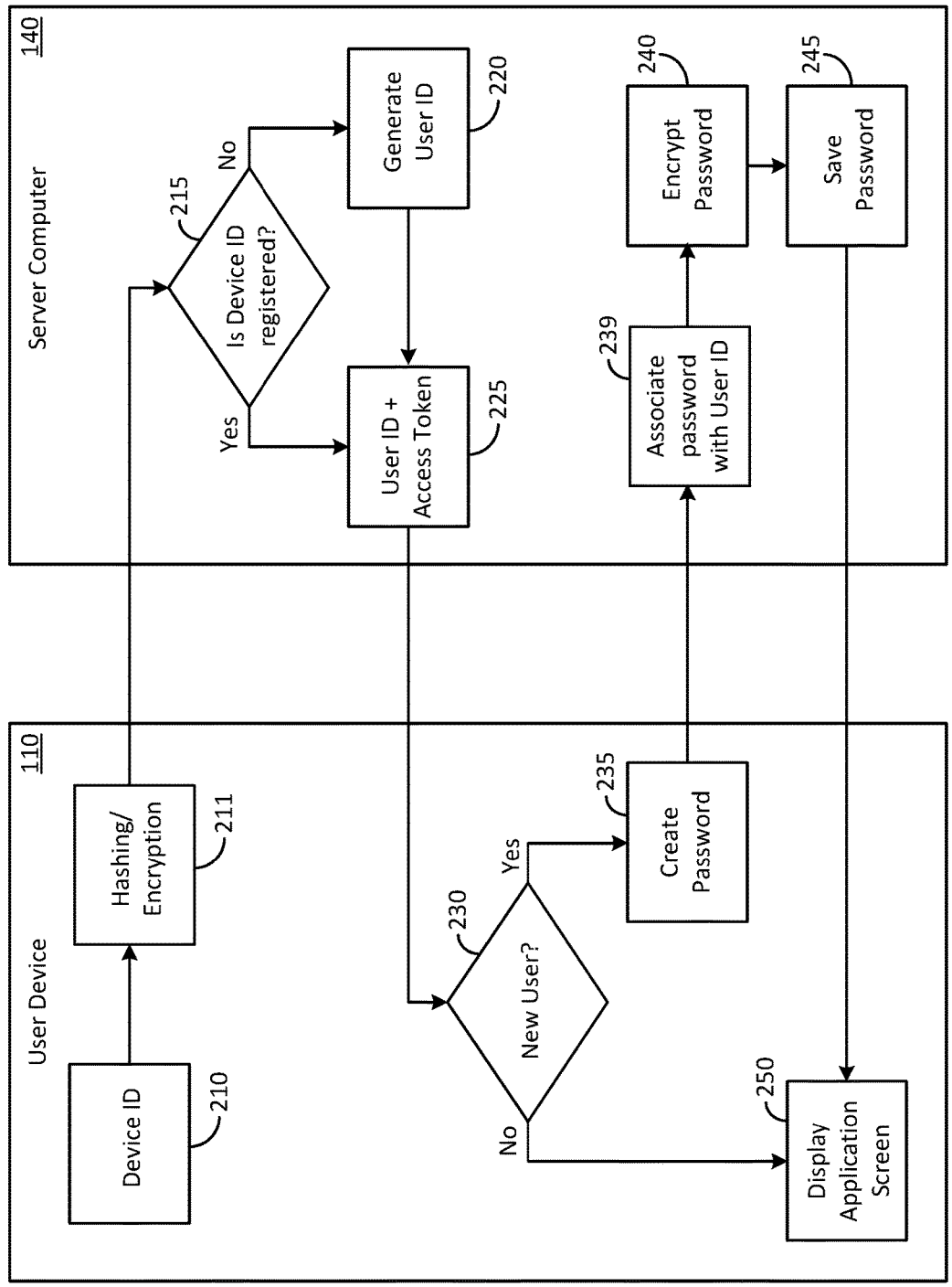
FIG. 2 illustrates a flowchart of an exemplary method to provide privacy to a user of a user device that supports a networked software platform in accordance with the disclosure.

FIG. 2 illustrates a flowchart 200 of an exemplary method to provide privacy to a user of a networked user device in accordance with the disclosure. The following description is directed at the first user 105 and the user device 110, but it must be understood that the description is equally valid for other users and other user devices in various embodiments in accordance with the disclosure.

The flowchart 200 illustrates a sequence of operations in the form of blocks that can be implemented in hardware, software, or a combination thereof. In the context of software, the operations represent non-transitory computer-executable instructions stored on one or more non-transitory computer-readable media that, when executed by one or more processors perform the recited operations. Generally, non-transitory computer-executable instructions include routines, programs, objects, components, data structures, and the like that perform particular functions or implement particular abstract data types. The order in which the operations are described is not intended to be construed as a limitation, and any number of the described operations may be carried out in a different order, omitted, combined in any order, and/or carried out in parallel.

The sequence of operations can be initiated when the first user 105 launches the networked software application on the user device 110. At block 210, the user device 110 obtains a device identifier (device ID). For example, the user device 110 may obtain a device ID of the user device 110 from an Apple® iCloud Keychain or from local storage on the user device 110. The device ID can be any of various identifiers that are persistent (unlike an IP address, which can be changed) and uniquely identifies the user device 110. A non-exhaustive list of device IDs that may be used in accordance with the disclosure may include, for example, a unique device identifier (UDID), a universally unique ID (UUID) (also known as a globally unique identifier (GUID), a serial number, an international mobile equipment identity (IMEI), an Android ID, an electronic serial number (ESN), a mobile equipment identifier (MEID), or an international mobile subscriber identity (IMSI).

At block 211, a hashed device ID is created in order to render the device ID anonymous and prevent the device ID from being identified by users of other devices such as the server computer 140 or a different user device. In one example embodiment, conferring anonymity to the user ID involves executing a hashing algorithm upon the user ID. The hashing algorithm can be applied in one or more of various forms such as, for example, middle-square hashing, multiplication hashing, and Fibonacci hashing. The original value of the device ID cannot be reverse-engineered from the hashed device ID without having knowledge of the details and the data used for executing the hashing algorithm that was used for the hashing in the user device 110. Such knowledge is not provided to the server computer 140 or to other user devices thereby preserving anonymity of the device ID and providing privacy to the user of the user device 110.

In some cases, such as, for example, when the user device 110 is using an Apple® iOS® operating system, the device ID can be an encrypted number that is generated by the user device 110 in accordance with RFC 4122. RFC 4122 is a proposed standard as an Internet protocol. Various forms of encryption may be used to generate the encrypted number, such as, for example, MD5 and SHA family (SHA-224, SHA-256, SHA-384, SHA-512, etc.). In such cases, the identity of the user device 110 is automatically maintained. Thus, encryption can work as a supplement or a complement to hashing for providing privacy to the user of the user device 110.

The server computer 140 receives the hashed device ID (or encrypted device ID) transmitted by the user device 110, and at block 215, a determination is made whether the hashed device ID is already registered on the networked software platform. The determination may be made by the server computer 140 using hashed device ID information stored in elements such as a database of the server computer 140, a database of the computer 120, and/or a data storage element. In one exemplary implementation, the data storage element can be a part of cloud services 136 and/or a device that is a part of the network 135. The determination at block 215 may also be made by the server computer 140 obtaining information from the administrator 115 via the computer 120.

If the hashed device ID is not registered on the networked software platform, at block 220, the server computer 140 generates a user ID based on the hashed device ID received from the user device 110. The user ID is a unique identifier that is used to uniquely identify the first user 105 of the user device 110. It can be understood that a different user ID would be generated by the server computer 140 for the second user 130 of the user device 125, and so on. The user ID can be provided in any of various forms, such as, for example, an integer having several digits (at least 10 digits, for example), a label, or an alphanumeric sequence. In one implementation, the user ID can be a 64-bit number that is generated by a random number generator number. The 64-bit number may be expressed as a hexadecimal string.

In an exemplary embodiment, the server computer 140 provides a look-up table and populates the lookup table in a matrix arrangement whereby each user ID (of a number of user IDs) is uniquely associated with a corresponding hashed device ID (of a number of hashed device IDs). For example, the hashed device ID of the user device 110 may be located in a first column of a first row of the matrix arrangement and the user ID of the first user 105 is located in a second column of the first row of the matrix arrangement. A processor can identify the user ID of the first user 105 by performing a search of the lookup table based on the device ID of the user device 110. The user ID can be accessed by the processor from the second column of the first row.

If, at block 215, the hashed device ID is already registered on the networked software platform, at block 225, the server computer 140 may generate an access token. The access token may be used by the user device 110 in subsequent communications with the server computer 140 for purposes of authentication. The subsequent communications may take place when the networked software platform is being used on the user device 110 by the first user 105.

In one exemplary implementation, the access token is generated in the form of an encrypted key and by the use of any of various encryption techniques. For example, the access token may be generated using one or more encryption techniques such as Adler 32, Blowfish, CRC-32, CRC-32B, DES, Gost, Havel-128, Htpasswd Apache, MD4, MD5, RIPEMD-128, RIPEMD-160, SHA-1, SHA-256, SHA-384, SHA-512, Snefru, Tiger-128, Tiger-160, Tiger-192, and Whirlpool (note: all are registered trademarks).

The action indicated at block 225 further includes the server computer 140 transmitting the access token and/or the user ID of the first user 105 to the user device 110. In some cases, the user ID of the first user 105 may also be encrypted using the same, similar, or different encryption technologies as used for encrypting the access token. The encrypted user ID may then be transmitted to the user device 110 either exclusively or along with the encrypted access token.

Encryption of the access token and/or user ID provides a certain level of security during transmission from the server computer 140 to the user device 110. The level of security may be further enhanced by using additional technologies such as Blockchain technology. Blockchain technology involves the use of a blockchain wherein a time-stamped series of immutable records of data is managed by a cluster of computers not owned by any single entity. Each of these blocks of data (i.e. block) is secured and bound to each other using cryptographic principles (i.e. chain).

In one exemplary implementation, the access token and/or user ID of a first user device may be generated in the first user device and a first block is passed on to a second user device, which uses the first block to generate an access token and/or user ID of its own, and then passes on a second block to a third user device, which uses the second block to generate an access token and/or user ID of its own, and so on.

In another exemplary implementation, the access token and/or user ID of a first user device may be generated in a first server computer. The first server computer may then transmit a first block to a second server computer, which uses the first block to generate an access token and/or user ID for a second user device. The second server computer may then transmit a second block to a third server computer, which uses the second block to generate an access token and/or user ID for a third user device, and so on.

At block 230, a determination is made whether the access token and/or user ID is associated with a new user of the user device 110. If associated with a registered user, the user device 110 displays an introductory page of the networked software application (a home page of a social software application such as Facebook®, for example), an introductory video sequence for a video game, or a portal of a medical application. The first user 105 may then proceed with performing activities on the networked software application.

If the access token and/or user ID is associated with a new user of the user device 110, at block 235, a prompt may be provided on the user device 110 prompting the first user 105 to enter a new password and, optionally, an alias. The newly created password is transmitted by the user device 110 to the server computer 140. In one case, the password may be transmitted in unencrypted form to the server computer 140. In another case, the alias may also be transmitted in unencrypted form to the server computer 140.

In an exemplary implementation, at block 239, the server computer 140 executes an association procedure whereby the password and/or alias is associated with the first user 105 and the user ID that was generated from the hashed device ID as described above. In another exemplary implementation, at block 239, the server computer 140 executes an association procedure whereby the password and/or alias is associated with another user of the user device 110 and the user ID that was generated from the hashed device ID as described above.

At block 240, the server computer 140 encrypts the new password and/or new alias using any of various encryption techniques such as the exemplary ones described above. At block 245, the server computer 140 may create an association between the new password and the new alias (either in unencrypted or in encrypted form) before saving the new password and/or new alias. In one implementation, the encrypted new password and/or new alias can be saved in a database of the server computer 140. In another implementation, the encrypted new password and/or new alias can be transmitted by the server computer 140 to cloud storage.

The saved encrypted new password and/or new alias is transmitted by the server computer 140 to the user device 110. Transmission of the encrypted new password and/or new alias to the user device 110 can include various security measures such as the exemplary ones described above (Blockchain, etc.).

Upon receiving the encrypted new password and/or new alias, the user device 110 may display the introductory page and/or introductory video of the networked software application (block 250).

Figure 3:
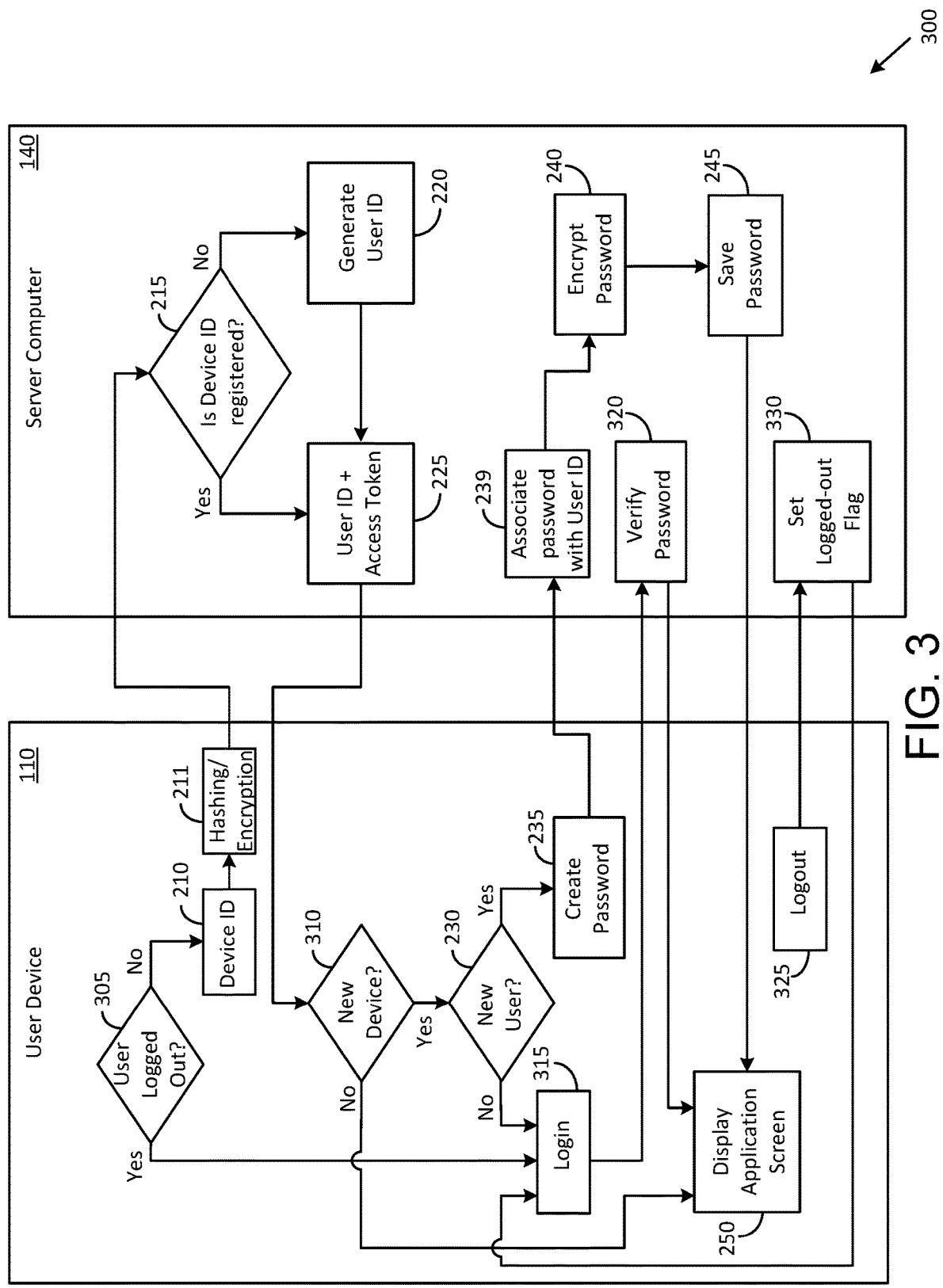
FIG. 3 illustrates a flowchart that includes some additional steps that can be a part of the flowchart illustrated in FIG. 2.

FIG. 3 illustrates a flowchart 300 that includes some additional steps that can be a part of the flowchart 200 illustrated in FIG. 2. The additional steps are indicated in block 305, block 310, block 315, block 320, block 325, and block 330.

At block 305, a determination is made whether the first user 105 has logged out of the networked software platform such as, for example, logged out of Facebook®. If the first user 105 is not logged out, such as, for example, when the first user 105 has just launched the networked software application on the user device 110, at block 210, the device ID of the user device 110 is hashed and/or encrypted at block 211 and then transmitted to the server computer 140, followed by generation of the encrypted user ID and the encrypted access token by the server computer 140 as described above. The encrypted user ID and/or the encrypted access token transmitted by the server computer 140 is received by the user device 110.

At block 310, a determination is made whether the user device 110 is being used for the first time to operate the networked software platform (a new device). If the user device 110 is being used for the first time, at block 230, a determination is made whether the first user 105 is a new user. If the first user 105 is a new user, at block 235, a prompt is provided on the user device 110 prompting the first user 105 to create a new password and/or a new alias. The newly created password and/or alias is transmitted by the user device 110 to the server computer 140, followed by the actions indicated in block 239, block 240, block 245, and block 250 as described above. More specifically, at block 239, the newly created password and/or alias is associated with the user ID and/or access code that is generated at block 220 and/or 225.

If the user is not logged out 305 and/or if the user is not a new user 230 who is using a new device 310, then, at block 315, a login screen is displayed on the user device 110. The password that is entered by the first user 105 is transmitted from the user device 110 to the server computer 140.

At block 320, the server computer 140 verifies the password. The server computer 140 may also determine if a logout flag has been set. If the password is found to be valid and the logout flag is set, the server computer 140 transmits an approval back to the user device 110. Upon receiving the approval, the user device 110 may allow the login procedure to proceed and may display an introductory page and/or an introductory video of the networked software application (block 250).

At block 325, the first user 105 may log out of the networked software application. The log out event is transmitted by the user device 110 to the server computer 140 wherein, at block 330, the logout flag is set to indicate that the first user 105 has logged out of the user device 110.

In an exemplary scenario in accordance with the disclosure, the first user 105 may attempt to gain access to the networked software application from a user device other than the user device 110. For example, the first user 105 may decide to gain access to the networked software application from a laptop computer. The server computer 140 determines whether the laptop computer is already registered with the server computer 140. If registered, the user ID may be left unchanged. The server computer 140 then determines if the laptop computer is a device that is being used for the first time to access the networked software platform (block 310). The subsequent actions indicated at block 230 and other blocks after block 230, can enable the first user 105 to use the laptop computer for accessing the networked software platform.

In another exemplary scenario in accordance with the disclosure, a user other than the first user 105 may attempt to operate the user device 110 to gain access to the networked software application. The user device 110 is already registered in the server computer 140. In this scenario, the action indicated at block 230 can allow the user to create a new password to gain access to the networked software platform.

Flags may be set and stored in the user device 110 and/or the server computer 140 and evaluated for various purposes in various scenarios such as, for example: when the first user 105 has not logged out of the user device 110 and resumes activities on the networked software platform; when the first user 105 has logged out of the user device 110 and is logging back in; when the networked software platform is uninstalled from the user device 110; when the networked software platform is re-installed on the user device 110; and when the networked software platform is newly installed on the user device 110. More particularly, a flag may be removed when the networked software platform is uninstalled from the user device 110. However, some information such as the user ID and device ID may be stored in the server computer 140 even though the networked software platform has been uninstalled. When the networked software platform is re-installed on the user device 110, the first user 105 has to create a new password but the saved information (user ID, device ID) may be re-used without as need for alteration.

Figure 4:
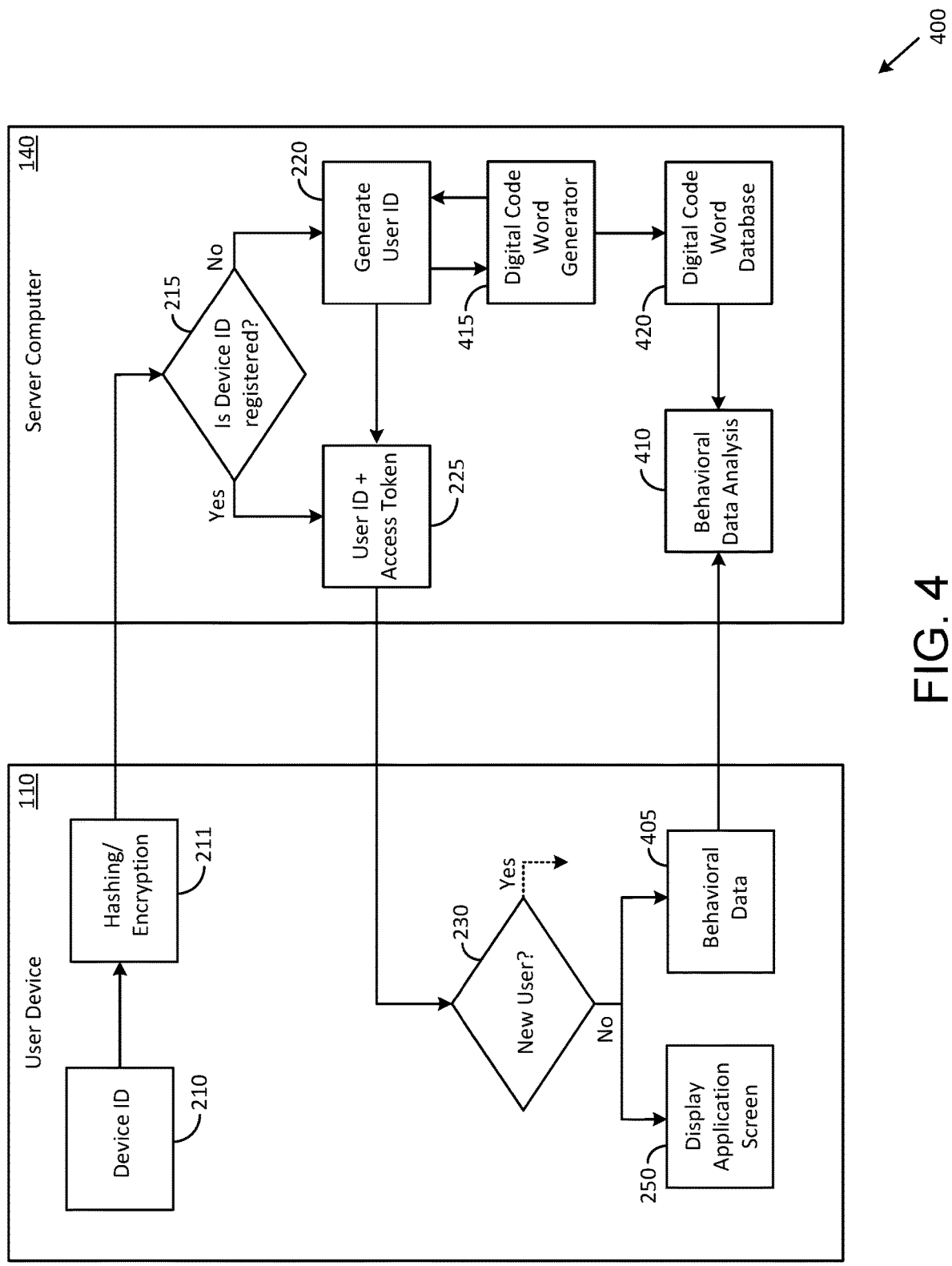
FIG. 4 illustrates a flowchart that includes some additional steps that can be a part of the flowchart illustrated in FIG. 2.

FIG. 4 illustrates a flowchart 400 that includes some additional steps that can be a part of the flowchart 200 illustrated in FIG. 2. The additional steps are indicated in block 405, block 410, and block 415.

As described above, at block 230, a determination is made whether the access token and/or user ID is associated with a new user of the user device 110. If associated with a registered user (i.e., the first user 105 is not a new user of the user device 110), the user device 110 displays an introductory page of the networked software application (a home page of a social software application such as Facebook®, for example) or an introductory video sequence for a video game. The first user 105 may then proceed with performing activities on the networked software application.

Furthermore, if the determination at block 230 indicates that the first user 105 is not a new user of the user device 110, at block 405 behavioral data of the first user 105 is collected by the user device 110. The behavioral data may be dependent on the nature of the networked software platform. For example, when the networked software platform is a social media platform ((Facebook®, WhatsApp®, Twitter®, etc.), the behavioral data may include items submitted to the networked software platform by one or more users (such as the first user 105) of the user device 110. A few examples of such items may include posts, messages, images, videos, news feeds, and chat content.

When the networked software platform is a video game platform (a video game played on a computer, Microsoft Xbox®, Sony Playstation®, etc.), the behavioral data may include items associated with video games played by one or more users (such as the first user 105) of the user device 110. A few example items can include a skill level of the first user 105, game scores of the first user 105, and expertise level of the first user 105.

When the networked software platform is a health-related application, the data may be personal data such as, for example, blood sugar level, blood pressure, heart condition, or incidence of a disease or illness.

The behavioral data and/or personal data may be transmitted by the user device 110 to the server computer 140 either in real-time, near real-time, periodically, or on an as-needed basis.

In one exemplary implementation, at block 410, the server computer 140 analyzes the behavioral data received from the user device 110. The analysis of the behavioral data may be dependent on the nature of the networked software platform. When the networked software platform is a social media platform ((Facebook®, WhatsApp®, Twitter®, etc.), the analysis of the behavioral data may involve operations such as, for example, policing the actions executed by one or more users (such as the first user 105) upon the user device 110, data mining, behavioral pattern detection, accumulating data, and/or statistical analysis.

The analysis of the behavioral data may be carried out by using a digital code word and/or user ID, such as, for example, a 16-bit digital code word. The digital code word may be produced by a digital code generator (at block 415) and used for generating a user ID for each new user (described above with reference to block 220). The digital code word constitutes a unique code that is associated exclusively with each individual user ID. For example, the digital code word associated with the user ID of the first user 105 is not used for association with any other user ID. The digital code word for each new user of the user device 110, as well as all registered users of the user device 110, can be stored at block 420, in a digital codeword database in the server computer 140.

Using the unique digital code word for analysis of the behavioral data ensures that an identity of each user of the user device 110 remains confidential. Thus, for example, an identity of the first user 105 of the user device 110 remains anonymous to the server computer 140 when the behavioral data of the first user 105 is analyzed by the server computer 140.

Despite the anonymity provided by the User ID and/or digital code word, the various users of the networked social platform are enabled to connect with each other and interact with each other via their user IDs and/or aliases. As such, the present invention enables users of a social.

In another exemplary implementation, at block 410, the server computer 140 may merely store the behavioral data received from the user device 110 and optionally analyze the behavioral data when deemed fit. In this implementation, the server computer 140 may be configured to make the behavioral data accessible to third-party entities, such as, for example, a data analytics company, a data mining company, or a marketing company. In some cases, the behavioral data may be provided to the third-party entity without inclusion of any information that can be used to associate the behavioral data with users and/or user devices. This procedure ensures privacy to the user 150 of the user device 110 as well as other users of other user devices. In some other cases, the behavioral data may be provided to the third-party entity along with hashed device ID data. Even in such cases, the privacy of the user 150 of the user device 110 and other users of other user devices is maintained because the hashed device ID data cannot be reverse-engineered by the third-party entity.

Figure 5:
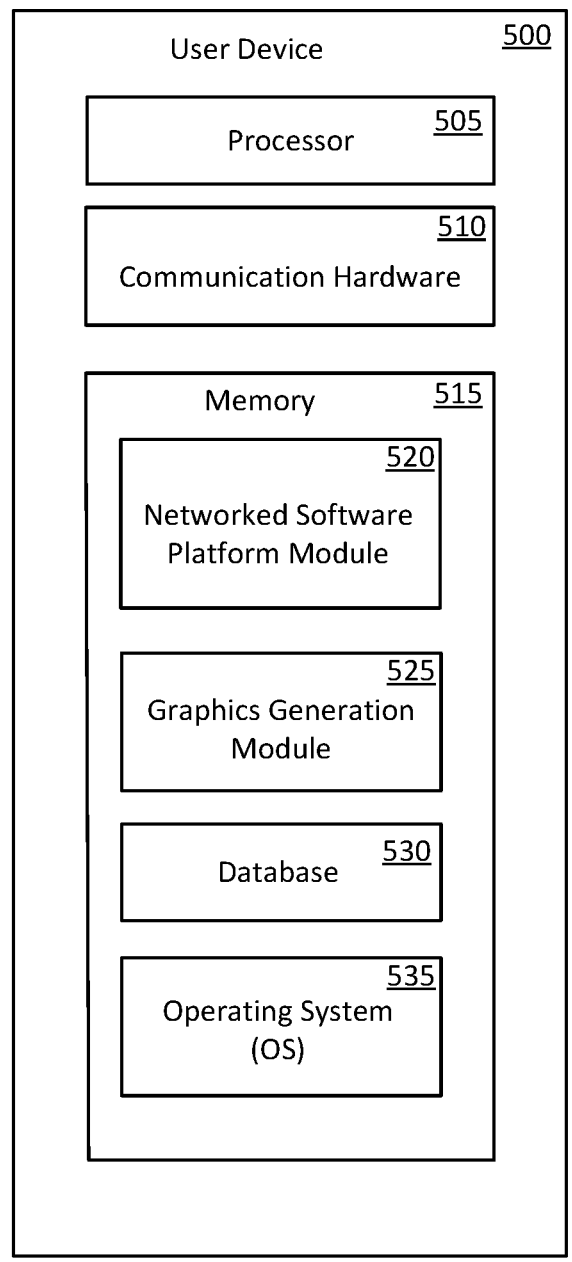
FIG. 5 shows some exemplary components that may be included in a user device that supports a networked software platform in accordance with the disclosure.

FIG. 5 shows some exemplary components that may be included in a user device 500 that supports a networked software platform in accordance with the disclosure. The user device 500 represents any of various user devices such as, for example, the user device 110, the user device 125, and the user device 145.

The exemplary components may include a processor 505, communication hardware 510, and a memory 515. The memory 515, which is one example of a non-transitory computer-readable medium, may be used to store an operating system (OS) 535, a database 530, and code modules such as a networked software platform module 520 and a graphics generation module 525. The code modules are provided in the form of non-transitory computer-executable instructions that can be executed by the processor 505 for performing various operations in accordance with the disclosure.

The processor 505 illustrated in FIG. 5 represents a single component in some implementations and a number of processors that operate cooperatively in some other implementations. The processor 505 can belong, for example, to one of the Intel, ARM, Qualcomm, and AMD families of microprocessors. In some embodiments, processor 505 may include specially designed hardware such as ASICs, electrically erasable programmable read-only memories (EEPROMs), field-programmable gate arrays (FPGAs), and so forth, for controlling operations of the user device 500. The memory 515 can be any of various types of devices such as, for example, a non-volatile random-access memory (RAM) and/or read-only memory (ROM). The memory 515 may be used for a variety of purposes such as, for example, caching and/or storing data, programming instructions, and the like. It should be further appreciated that the processor 505 may be one of a variety of SOC type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

Communication hardware 510 allows the user device 500 to provide a wide variety of communication services. When the user device is a personal communication device such as a smartphone, for example, communication hardware 510 can support functions such as phone calls, text messaging, and browser applications. Communication hardware 510 may also support communications via a network such as the network 135, between the user device 500 and other devices such as, for example, the server computer 140, the user device 125, and the user device 145.

Communication hardware 510 may also include interfaces such as, for example, a network interface card (NIC). Generally, a NIC controls the sending and receiving of data packets over a network such as the network 135. Some other exemplary interfaces can include Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

The networked software platform module 520 includes non-transitory computer-executable instructions that are executed by the processor 505 for running a networked software platform in accordance with the disclosure. A few examples of such a networked software platform can include a social media platform (Facebook®, WhatsApp®, Twitter®, for example) or a video game platform (a video game executed on a personal computer or on a dedicated gaming machine, (such as, for example, Microsoft Xbox®, or Sony Playstation®). In some cases, the networked software platform may include imagery displayed on a web browser, such as Microsoft Internet Explorer® or Google Chrome®.

The web browser and/or other images that may be displayed on a display screen of the user device 500 can be generated by execution of the graphics generation module 525.

The database 530 may be used to store various types of information such as, for example, a device ID, a user ID, a password, and behavioral data. The database 530 may also be used to store various types of information pertaining to the networked software platform such as, for example, statistics related to a video game or contact information of users.

Figure 6:
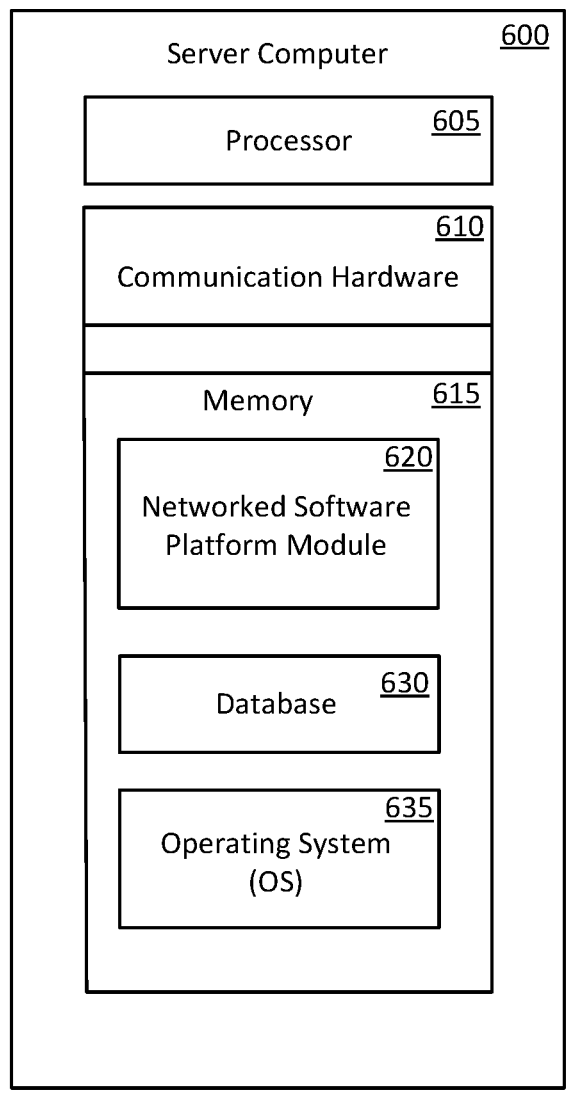
FIG. 6 shows some exemplary components that may be included in a server computer that supports a networked software platform in accordance with the disclosure.

FIG. 6 shows some exemplary components that may be included in a server computer 600 that provide support to one or more user devices for executing a networked software platform in accordance with the disclosure. The server computer 600 represents any of various devices such as, for example, the server computer 140 described herein. The exemplary components may include a processor 605, communication hardware 610, and a memory 615. The memory 615, which is another example of a non-transitory computer-readable medium, may be used to store an operating system (OS) 635, a database 630, and code modules such as a networked software platform support module 620. The code modules are provided in the form of non-transitory computer-executable instructions that can be executed by the processor 605 for performing various operations in accordance with the disclosure. The processor 605 can be any single component or a set of components that may be typically included in a server computer. The communication hardware 610 allows the server computer 600 to communicate with various user devices and other devices including other server computers and the computer 120 operated by the administrator 115. The operating system 635 can be any OS that is typically incorporated into a server computer for performing server functions. The networked software platform support module 620 and the database 630 are configured to support the various operations described herein in accordance with the disclosure, such as, for example, the various flowcharts. With reference to the embodiment illustrated in FIG. 4, the networked software platform support module 620 may be executed by the processor 605 to perform behavioral analysis upon the behavioral data received from the user device 110.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

Although the user device 500 shown in FIG. 5 illustrates one specific architecture for a user device for implementing one or more of the embodiments described herein, it is by no means the only device architecture on which at least a portion of the features and techniques described herein may be implemented. For example, architectures having one or any number of processors may be used, and such processors may be present in a single device or distributed among any number of devices. In one aspect, a single processor may handle communication tasks, as well as routing tasks, while in other embodiments a separate dedicated communications processor may be provided. In various embodiments, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, the memory 515 and the memory 615) configured to store data, program instructions for the general-purpose network operations, or other information relating to the functionality of the embodiments described herein (or any combinations of the above). Program instructions may control execution of or comprise an operating system and/or one or more applications, for example. The memory may also be configured to store data structures, configuration data, encryption data, historical system operations information, or any other specific or generic non-program information described herein.

Because such information and program instructions may be employed to implement one or more systems or methods described herein, at least some network device embodiments may include non-transitory machine-readable storage media, which, for example, may be configured or designed to store program instructions, state information, and the like for performing various operations described herein. Examples of such non-transitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as ROM, flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, RAM, and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Processors such as the processor 505 and the processor 605 may carry out computing instructions under control of the operating system 535 and the operating system 635 respectively, each of which can be an operating system such as, for example, a version of MICROSOFT WINDOWS™ operating system, APPLE macOS™ or iOS™ operating systems, some variety of the Linux operating system, ANDROID™ operating system, or the like. In many cases, one or more shared services may be used for providing common services such as, for example, WINDOWS™ services, user-space common services in a Linux environment, or any other type of common service architecture used with an operating system. Input devices to the user devices and server computer described herein may be of any type suitable for receiving user input, including for example a keyboard, touchscreen, microphone (for example, for voice input), mouse, touchpad, trackball, or any combination thereof. Output devices may be of any type suitable for providing output to one or more users, whether remote or local to the device, and may include for example one or more screens for visual output, speakers, printers, or any combination thereof. 26 include flash memory, magnetic hard drive, CD-ROM, and/or the like.

In some embodiments, systems may be implemented on a distributed computing network, such as one having any number of clients and/or servers.

For example, in various embodiments one or more databases may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

In various embodiments, functionality for implementing systems or methods of various embodiments may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various embodiments described above. Accordingly, the present invention is defined by the claims and their equivalents.

Additional Considerations

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

As used herein, the words "example" and "exemplary" as used herein are intended to be non-exclusionary and non-limiting in nature. More particularly, the word "exemplary" as used herein indicates one among several examples, and it should be understood that no undue emphasis or preference is being directed to the particular example being described.

Upon reading this disclosure, those of skill in the art will appreciate still additional alternative structural and functional designs for a system and a process for creating an interactive message through the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

That which is claimed is:

1. A computer-implemented method for preserving privacy and anonymity in a networked software platform by using tokenized encryption technologies, the computer-implemented method comprising:
    receiving, by a first computer, a hashed device identifier (hashed device ID) that uniquely identifies a first user device executing an application associated with the networked software platform, wherein the hashed device ID is generated by the application executing on the first user device;
    generating, by the first computer, a user identity (user ID) based on the hashed device ID, the user ID created by associating a digital code word with the device ID;
    generating, by the first computer, an access token for a first user of the first user device, the access token being generated in the form of an encrypted key that is generated by applying an encryption technique; and
    transmitting, by the first computer, to the first user device, at least one of the user ID or the access token for providing privacy to the first user when used by the first user to communicate with at least the first computer by enabling the use of the user ID and/or the access token to track user activity within the networked software platform.

2. The computer-implemented method of claim 1, wherein the first computer is a server computer, and the method further comprises:
    associating the user ID with at least one of behavioral data or personal data of the first user, wherein the behavioral data is collected from usage of the networked software platform by the first user; and
    providing anonymity to the first user by using the user ID when deriving information from at least one of behavioral data or personal data of the first user in the server computer in at least one of the first computer or a second computer.

3. The computer-implemented method of claim 1, wherein the first computer is a server computer, and the method further comprises:
    receiving, by the server computer, from the first user device, a password that is generated by the first user of the first user device;
    creating, by the server computer, an association between the unencrypted password and the user ID; and
    generating, by the server computer, an encrypted password based on encrypting the unencrypted password.

4. The computer-implemented method of claim 1, wherein creating the user ID based on the hashed device ID comprises associating the hashed device ID with a digital code word.

5. The computer-implemented method of claim 4, further comprising:
    using the digital code word to derive information from at least one of behavioral data or personal data of the first user in at least one of the first computer or a second computer, wherein using the digital code word provides anonymity to the first user.

6. The computer-implemented method of claim 1, wherein the hashed device ID is generated by the first user device based on one of a unique device identifier (UDID) of the first user device, a serial number of the first user device, an international mobile equipment identity (IMEI) of the first user device, Android ID of the first user device, electronic serial number (ESN) of the first user device, a mobile equipment identifier (MEID) of the first user device, or an international mobile subscriber identity (IMSI) of the first user device.

7. The computer-implemented method of claim 6, wherein the first computer is configured to operate as a server computer, wherein the user ID is an integer having at least 10 digits, and wherein the access token is an encrypted key generated by the server computer.

8. The computer-implemented method of claim 1, wherein the networked software platform comprises one of a social media platform, a video game platform, or a health-related diagnostic tool.

* * * * *